(12) United States Patent
Brita et al.

(10) Patent No.: US 7,932,206 B2
(45) Date of Patent: Apr. 26, 2011

(54) MAGNESIUM DICHLORIDE-BASED ADDUCTS AND CATALYST COMPONENTS OBTAINED THEREFROM

(75) Inventors: Diego Brita, Ferrara (IT); Andrea Casalini, Bologna (IT); Daniele Evangelisti, Ferrara (IT); Ofelia Fusco, Ferrara (IT); Gianni Collina, Ferrara (IT)

(73) Assignee: Basell Poliolefine Italia S.p.A., Milan (IT)

( * ) Notice: Subject to any disclaimer, the term of this patent is extended or adjusted under 35 U.S.C. 154(b) by 57 days.

(21) Appl. No.: 10/537,079

(22) PCT Filed: Nov. 25, 2003

(86) PCT No.: PCT/EP03/13818
§ 371 (c)(1),
(2), (4) Date: Jun. 1, 2005

(87) PCT Pub. No.: WO2004/054711
PCT Pub. Date: Jul. 1, 2004

(65) Prior Publication Data
US 2006/0025300 A1 Feb. 2, 2006

Related U.S. Application Data

(60) Provisional application No. 60/435,195, filed on Dec. 20, 2002, provisional application No. 60/482,697, filed on Jun. 26, 2003.

(30) Foreign Application Priority Data

Dec. 18, 2002 (EP) .................................. 02080616
May 14, 2003 (EP) .................................. 03101357

(51) Int. Cl.
*B01J 23/00* (2006.01)
*B01J 21/00* (2006.01)
*B01J 25/00* (2006.01)
*B01J 29/00* (2006.01)
*B01J 31/00* (2006.01)
*B01J 27/138* (2006.01)

(52) U.S. Cl. ........ 502/150; 502/100; 502/151; 502/162; 502/172; 502/226

(58) Field of Classification Search ................. 502/118, 502/125–127, 134, 158, 169, 172, 150, 100, 502/151, 162, 226; 526/124.9, 125.1, 125.3, 526/125.4, 125.6
See application file for complete search history.

(56) References Cited

U.S. PATENT DOCUMENTS

| 4,226,741 A | 10/1980 | Luciani et al. ............ 252/429 B |
| 4,298,718 A | 11/1981 | Mayr et al. ................... 526/125 |
| 4,399,054 A | 8/1983 | Ferraris et al. ............ 252/429 B |
| 4,829,034 A | 5/1989 | Iiskolan et al. ................... 302/9 |
| 5,212,132 A | 5/1993 | Spitz et al. ..................... 502/134 |
| 6,034,025 A * | 3/2000 | Yang et al. .................... 502/126 |
| 6,221,801 B1 | 4/2001 | Brusson et al. .............. 502/104 |

FOREIGN PATENT DOCUMENTS

| EP | 0045977 | 2/1982 |
| EP | 0361494 | 4/1990 |
| EP | 0395083 | 10/1990 |
| EP | 0717052 | 6/1996 |
| EP | 0728769 | 8/1996 |
| EP | 1083187 | 3/2001 |
| JP | 61145207 | 7/1986 |
| JP | 4331210 | 11/1992 |
| WO | 9844009 | 10/1998 |

* cited by examiner

*Primary Examiner* — James E McDonough
(74) *Attorney, Agent, or Firm* — Dilworth IP, LLC

(57) ABSTRACT

Solid Lewis adducts comprising $MgCl_2$, a Lewis base (LB) belonging to ethers, esters, ketones, silanes or amines and an alcohol ROH, in which R is a C1-C15 hydrocarbon group optionally substituted with heteroatoms containing groups, which compounds are in molar ratios to each other defined by the following formula $MgCl_2(ROH)_m(LB)_n$ in which m ranges from 0.05 to 6, n ranges from 0.08 to 6. The solid Lewis adducts herein can be used to prepare catalysts having good morphological stability, and high polymerization activity.

26 Claims, No Drawings

MAGNESIUM DICHLORIDE-BASED ADDUCTS AND CATALYST COMPONENTS OBTAINED THEREFROM

This application is the U.S. national phase of International Application PCT/EP2003/013818, filed Nov. 25, 2003, claiming priority to European Patent Application Numbers 02080616.2 filed Dec. 18, 2002, and 03101357.6 filed May 14, 2003, and the benefit under 35 U.S.C. 119(e) of U.S. Provisional Application Nos. 60/435,195, filed Dec. 20, 2002, and 60/482,697 filed Jun. 26, 2003; the disclosures of International Application PCT/EP2003/013818, European Patent Applications 02080616.2 and 03101357.6, and U.S. Provisional Application Nos. 60/435,195 and 60/482,692, each as filed, are incorporated herein by reference.

The present invention relates to Lewis adducts comprising magnesium dichloride, an alcohol and another Lewis base in specific amounts. The adducts of the present invention are particularly useful as precursors of Ziegler-Natta catalyst components for the polymerization of olefins.

The modern ZN catalysts including titanium compounds supported on magnesium halides are well known in the art. Catalysts of this type are described in the U.S. Pat. No. 4,298,718. Said catalysts comprise titanium tetrahalides supported on halides of magnesium. Although the catalysts have high activity in the polymerization of alpha olefins like propylene, they are not very stereospecific. Improvements to stereospecificity have been made by adding electron-donor compounds to the solid catalyst component.

Substantial improvements were obtained by using, in addition to the electron-donor present in the solid component, an electron-donor (external) added to the aluminium alkyl co-catalyst component or the polymerization reactor.

The catalysts modified in this manner although being highly stereospecific (Isotactic Index about 94-95%) still did not show sufficiently high levels of activity.

Significant improvements in both activity and stereospecificity were obtained by preparing the solid catalytic component according to the technique described in U.S. Pat. No. 4,226,741.

High level performance in catalyst activity, as well as stereospecificity, have been obtained with the catalysts described in the European patent No. 045977. Said catalysts have as solid catalysts component, a magnesium halide on which is supported a titanium halide, preferably $TiCl_4$, and an electron-donor compound, selected from specific classes of carboxylic acid esters, and, as co-catalyst component, a system formed of an Al-trialkyl compound and a silicon compound containing at least one Si—OR bond (R hydrocarbyl radical).

Nevertheless the results described above, research activities have been continued with the purpose of modifying and/or improving the performance of the mentioned catalysts.

The European patent No. 0361494 and EP 728769 describe very active solid catalyst components for the polymerization of olefins comprising, as an internal electron-donor compound, a 1,3-diether characterized by a specific structure and/or by specific reactivity characteristics toward the anhydrous magnesium chloride and $TiCl_4$.

The catalysts obtained from the reaction of said catalyst components with an Al-alkyl compound exhibit a so high activity and stereospecificity in the polymerization of olefins, that the use of an external electron-donor can be avoided.

It is also desirable that the catalyst be characterized by a good morphological stability so as to avoid or limit the formation of fine particles that can cause problems to the polymerization plant operation. Improvements in this aspect have been obtained by using Ziegler-Natta catalysts disclosed in EP 395083 obtained by contacting a titanium compound, optionally an electron donor compound (a phthalate), with a $MgCl_2\cdot(EtOH)_m$ in which m is from 0.15 to 1.7 that has been in turn obtained by partial dealcoholation of adducts with a higher alcohol content. This approach, although generally effective, is not particularly suitable for the catalysts including 1,3-diethers as internal donor because the performances of the catalysts worsen to a level which, in some cases, makes the use of 1,3 diethers as internal donor no longer effective. It would be therefore important to find a way of generating a catalyst having a good morphological stability and high activities even when a 1,3-diether is used as internal donor. The applicant has now found that the above-mentioned problem can be solved by the use of special precursors of the catalysts.

The present invention therefore relates to solid Lewis adducts comprising $MgCl_2$, a Lewis base (LB) belonging to ethers, esters, ketones, silanes or amines and an alcohol ROH, in which R is a C1-C15 hydrocarbon group optionally substituted with heteroatoms containing groups, which compounds are in molar ratios to each other defined by the following formula $MgCl_2(ROH)_m(LB)_n$ in which m ranges from 0.05 to 6, n ranges from 0.07 to 6.

Preferably, the LB is selected from ethers, esters and ketones, more preferably from ethers and esters and in particular from ethers.

Preferred ethers are the C2-C20 aliphatic ethers and in particulars cyclic ethers preferably having 3-5 carbon atoms such as tetrahydrofurane, dioxane. Also suitable are the linear or cyclic aliphatic ethers having two or more ether groups. Preferred esters are the alkyl esters of C1-C10 aliphatic carboxylic acids and in particulars C1-C4 alkyl esters of aliphatic mono carboxylic acids such as ethylacetate and methyl formiate.

Preferred R groups are C1-C10 saturated hydrocarbon groups, in particular methyl, ethyl and C3-C8 alkyl groups. Specific examples of ROH alcohols according to the invention are methanol, ethanol propanol, isopropanol, n-butanol, i-propanol, sec-butanol, tert-butanol, pentanol, 2-methyl-1-pentanol, 2-ethyl-1-hexanol, phenol, 4-methyl-1-phenol, 2,6-dimethyl-1-phenol, cyclohexanol, cyclopentanol. Methanol, n-butanol, sec-butanol, i-propanol, and 2-methyl-1-pentanol are preferred. Ethanol is especially preferred.

Preferably m ranges from 0.1 to 4.5, more preferably from 0.5 to 4 and especially from 0.5 to 2.5.

Preferably n ranges from 0.08 to 3, more preferably from 0.1 to 2.5 and especially from 0.5 to 2.

The ratio (m/n) is generally higher than 0.4 and preferably higher than 0.5.

The Lewis adduct of the invention can contain also some water in a molar ratio defined by the formula $MgCl_2ROH)_m(LB)_n(H_2O)_p$ in which the index p ranges from 0.01 to 0.6 and particularly from 0.01 to 0.4.

The adducts of the present invention can be prepared according to several methods. According to one of these methods the adducts can be prepared by contacting the desired amounts of $MgCl_2$, ROH and LB optionally in the presence of an inert liquid diluent, heating the system up to the melting temperature of the mixture and maintaining said conditions so as to obtain a completely molten adduct.

The said molten adduct can then be emulsified in a liquid medium which is immiscible with and chemically inert to it and finally quenched by contacting the adduct with an inert cooling liquid thereby obtaining the solidification of the adduct in substantially spherical particles. The liquid in which the molten adduct is emulsified can be any liquid immiscible with and chemically inert to the molten adduct. For example, aliphatic, aromatic or cycloaliphatic hydrocarbons can be used as well as silicone oils. Aliphatic hydrocarbons such as vaseline oil are particularly preferred.

An alternative embodiment the adduct of the invention is obtained in solid form by subjecting the molten adduct mentioned above to spray-cooling process. When this option is pursued it is preferred that in the first step the magnesium chloride, the alcohol and the electron donor compound be contacted to each other in the absence of an inert liquid diluent. After having been molten the adduct is sprayed, through the use of the proper devices that are commercially available, in an environment having temperature so low as to cause rapid solidification of the particles. The cold environment can comprise a cold liquid or gas. In a preferred aspect the adduct is sprayed in a cold liquid environment and more preferably in a cold liquid hydrocarbon.

Yet another method, which is preferred, for the preparation of the solid adducts of the invention comprises contacting the LB or ROH compound with a preformed solid $MgCl_2(ROH)_m$ or $MgCl_2(LB)_n$ adduct respectively. Preferably, the adduct is formed by contacting the LB compound with the desired amounts of $MgCl_2(ROH)_m$ adduct. The said contact can be carried out in liquid hydrocarbon medium under stirring conditions. It is also possible to add the LB compound in a vapor phase, and particularly in a loop reactor as described in WO98/44009. It has been proved effective, and sometimes preferable, to the contact LB compound with $MgCl_2(ROH)_m$ adducts, especially $MgCl_2(EtOH)_m$, deriving from starting adducts in which part of the alcohol has been removed by physical (for example under a hot nitrogen stream) or chemical dealcoholation. These dealcoholated adducts and their preparation are described for example in EP395083 the relevant part of which is included by reference.

All these methods provide solid adducts having a substantially spherical morphology which are particularly suitable in the preparation of spherical catalyst components for the polymerization of olefins and in particular for the gas-phase polymerization process. With the term substantially spherical morphology are meant those particles having a ratio between the greater and smaller axis equal to or lower than 1.5 and preferably lower than 1.3.

As explained above, while water may be one of the constituents of the adduct too high levels of it should preferably be avoided. In doing that, it can be useful to control the water content of the reactants. In fact, $MgCl_2$, and also certain ROH alcohol are highly hygroscopic and tend to incorporate water in their structure. As a result, if the water content of the reactants is relatively high, the final adducts may contain an undesired amount of water even if it has not been added as a separate component. Means for controlling or lowering the water content in solids or fluids are well known in the art. The water content in $MgCl_2$ can be for example lowered by drying it in an oven at high temperatures or by reacting it with a compound which is reactive towards water. As an example, a stream of HCl can be used to remove water from $MgCl_2$. Water from the fluids can be removed by various techniques such as distillation or by allowing the fluids to become in contact with substances capable to subtract water such as molecular sieves.

As mentioned above these adducts can be advantageously used in the preparation of catalyst components for the polymerization of olefins. The said catalyst components can be obtained by contacting the adducts of the invention with compounds of transition metals belonging to one of the compound of one of the groups 4 to 6 of the Periodic Table of Elements (new notation). Among transition metal compounds particularly preferred are titanium compounds of formula $Ti(OR)_nX_{y-n}$ in which n is comprised between 0 and y; y is the valence of titanium; X is halogen and R is an alkyl radical having 1-10 carbon atoms or a COR group. Among them, particularly preferred are titanium compounds having at least one Ti-halogen bond such as titanium tetrahalides or halogenalcoholates. Preferred specific titanium compounds are $TiCl_3$, $TiCl_4$, $Ti(OBu)_4$, $Ti(OBu)Cl_3$, $Ti(OBu)_2Cl_2$, $Ti(OBu)_3Cl$. Preferably the contact is carried out by suspending the adduct in cold $TiCl_4$ (generally 0° C.); then the so obtained mixture is heated up to 80-130° C. and kept at this temperature for 0.5-2 hours. After that the excess of $TiCl_4$ is removed and the solid component is recovered. The treatment with $TiCl_4$ can be carried out one or more times. As mentioned above, also a steromodulating electron donor compound can be added to the solid catalyst component in order to make it stereospecific. The introduction of the electron donor can be done simultaneously with the reaction between transition metal compound and the adduct. As a result of this contact the electron donor compound normally remains deposited on the catalyst component. Said electron donor compound can be same as, or different from, the LB compound mentioned above and is generally selected from esters, ethers, amines, and ketones. In particular, as mentioned above, excellent results have been obtained with the use of 1,3-diethers of formula (I)

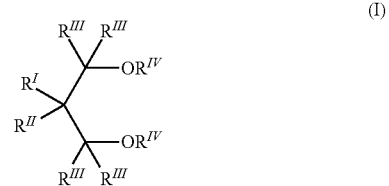

(I)

where $R^I$ and $R^{II}$ are the same or different and are hydrogen or linear or branched $C_1$-$C_{18}$ hydrocarbon groups which can also form one or more cyclic structures; $R^{III}$ groups, equal or different from each other, are hydrogen or $C_1$-$C_{18}$ hydrocarbon groups; $R^{IV}$ groups equal or different from each other, have the same meaning of $R^{III}$ except that they cannot be hydrogen; each of $R^I$ to $R^{IV}$ groups can contain heteroatoms selected from halogens, N, O, S and Si.

Preferably, $R^{IV}$ is a 1-6 carbon atom alkyl radical and more-particularly a methyl while the $R^{III}$ radicals are preferably hydrogen. Moreover, when $R^I$ is methyl, ethyl, propyl, or isopropyl, $R^{II}$ can be ethyl, propyl, isopropyl, butyl, isobutyl, tert-butyl, isopentyl, 2-ethylhexyl, cyclopentyl, cyclohexyl, methylcyclohexyl, phenyl or benzyl; when $R^I$ is hydrogen, $R^{II}$ can be ethyl, butyl, sec-butyl, tert-butyl, 2-ethylhexyl, cyclohexylethyl, diphenylmethyl, p-chlorophenyl, 1-naphthyl, 1-decahydronaphthyl; $R^I$ and $R^{II}$ can also be the same and can be ethyl, propyl, isopropyl, butyl, isobutyl, tert-butyl, neopentyl, phenyl, benzyl, cyclohexyl, cyclopentyl.

Specific examples of ethers that can be advantageously used include: 2-(2-ethylhexyl)1,3-dimethoxypropane, 2-isopropyl-1,3-dimethoxypropane, 2-butyl-1,3-dimethoxypropane, 2-sec-butyl-1,3-dimethoxypropane, 2-cyclohexyl-1,3-dimethoxypropane, 2-phenyl-1,3-dimethoxypropane, 2-tert-butyl-1,3-dimethoxypropane, 2-cumyl-1,3-dimethoxypropane, 2-(2-phenylethyl)-1,3-dimethoxypropane, 2-(2-cyclohexylethyl)-1,3-dimethoxypropane, 2-(p-chlorophenyl)-1,3-dimethoxypropane, 2-(diphenylmethyl)-1,3-dimethoxypropane, 2(1-naphtyl)-1,3-dimethoxypropane, 2(p-fluorophenyl)-1,3-dimethoxypropane, 2(1-decahydronaphthyl)-1,3-dimethoxypropane, 2(p-tert-butylphenyl)-1,3-dimethoxypropane, 2,2-dicyclohexyl-1,3-dimethoxypropane, 2,2-diethyl-1,3-dimethoxypropane, 2,2-dipropyl-1,3-dimethoxypropane, 2,2-dibutyl-1,3-dimethoxypropane, 2,2-diethyl-1,3-diethoxypropane, 2,2-dicyclopentyl-1,3-dimethoxypropane, 2,2-dipropyl-1,3-diethoxypropane, 2,2-dibutyl-1,3-diethoxypropane, 2-methyl-2-ethyl-1,3-dimethoxypropane, 2-methyl-2-propyl-1,3-dimethoxypropane, 2-methyl-2-benzyl-1,3-dimethoxypropane, 2-methyl-2-phenyl-1,3-dimethoxypropane, 2-methyl-2-cyclohexyl-1,3-dimethoxypropane, 2-methyl-2-methylcyclohexyl-1,3-dimethoxypropane, 2,2-bis(p-chlorophenyl)-1,3-dimethoxypropane, 2,2-bis(2-phenylethyl)-1,3-dimethoxypropane, 2,2-bis(2-cyclohexylethyl)-1,3-dimethoxypropane, 2-methyl-2-isobutyl-1,3-dimethoxypropane, 2-methyl-2-(2-ethylhexyl)-1,3-dimethoxypropane, 2,2-bis(2-ethylhexyl)-1,3-dimethoxypropane, 2,2-bis(p-methylphenyl)-1,3-dimethoxypropane, 2-methyl-2-isopropyl-1,3-dimethoxypropane, 2,2-diisobutyl-1,3-dimethoxypropane, 2,2-diphenyl-1,3-dimethoxypropane, 2,2-dibenzyl-1,3-dimethoxypropane, 2-isopropyl-2-cyclopentyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2-isobutyl-2-isopropyl-1,3-dimethoxypropane, 2,2-di-sec-butyl-1,3-dimethoxypropane, 2,2-di-tert-butyl-1,3-dimethoxypropane, 2,2-dineopentyl-1,3-dimethoxypropane, 2-iso-propyl-2-isopentyl-1,3-dimethoxypropane, 2-phenyl-2-benzyl-1,3-dimethoxypropane, 2-cyclohexyl-2-cyclohexylmethyl-1,3-dimethoxypropane.

Furthermore, particularly preferred are the 1,3-diethers of formula (II)

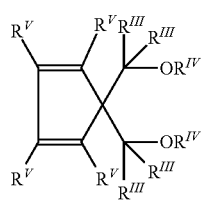

(II)

where the radicals $R^{IV}$ have the same meaning explained above and the radicals $R^{III}$ and $R^{V}$ radicals, equal or different to each other, are selected from the group consisting of hydrogen; halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkaryl and $C_7$-$C_{20}$ aralkyl radicals and two or more of the $R^V$ radicals can be bonded to each other to form condensed cyclic structures, saturated or unsaturated, optionally substituted with $R^{VI}$ radicals selected from the group consisting of halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkaryl and $C_7$-$C_{20}$ aralkyl radicals; said radicals $R^V$ and $R^{VI}$ optionally containing one or more heteroatoms as substitutes for carbon or hydrogen atoms, or both.

Preferably, in the 1,3-diethers of formulae (I) and (II) all the $R^{III}$ radicals are hydrogen, and all the $R^{IV}$ radicals are methyl. Moreover, are particularly preferred the 1,3-diethers of formula (II) in which two or more of the $R^V$ radicals are bonded to each other to form one or more condensed cyclic structures, preferably benzenic, optionally substituted by $R^{VI}$ radicals. Especially preferred are the compounds of formula (III):

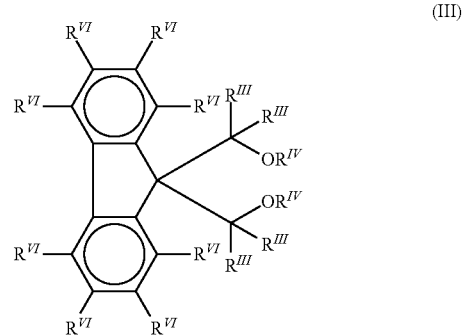

(III)

where the $R^{VI}$ radicals equal or different are hydrogen; halogens, preferably Cl and F; $C_1$-$C_{20}$ alkyl radicals, linear or branched; $C_3$-$C_{20}$ cycloalkyl, $C_6$-$C_{20}$ aryl, $C_7$-$C_{20}$ alkylaryl and $C_7$-$C_{20}$ aralkyl radicals, optionally containing one or more heteroatoms selected from the group consisting of N, O, S, P, Si and halogens, in particular Cl and F, as substitutes for carbon or hydrogen atoms, or both; the radicals $R^{III}$ and $R^{IV}$ are as defined above for formula (II). Specific examples of compounds comprised in formulae (II) and (III) are: 1,1-bis(methoxymethyl)-cyclopentadiene; 1,1-bis(methoxymethyl)-2,3,4,5-tetramethylcyclopentadiene; 1,1-bis(methoxymethyl)-2,3,4,5-tetraphenylcyclopentadiene; 1,1-bis(methoxymethyl)-2,3,4,5-tetrafluorocyclopentadiene; 1,1-bis(methoxymethyl)-3,4-dicyclopentylcyclopentadiene; 1,1-bis(methoxymethyl)indene; 1,1-bis(methoxymethyl)-2,3-dimethylindene; 1,1-bis(methoxymethyl)-4,5,6,7-tetrahydroindene; 1,1-bis(methoxymethyl)-2,3,6,7-tetrafluoroindene; 1,1-bis(methoxymethyl)-4,7-dimethylindene; 1,1-bis(methoxymethyl)-3,6-dimethylindene; 1,1-bis(methoxymethyl)-4-phenylindene; 1,1-bis(methoxymethyl)-4-phenyl-2-methylindene; 1,1-bis(methoxymethyl)-4-cyclohexylindene; 1,1-bis(methoxymethyl)-7-(3,3,3-trifluoropropyl)indene; 1,1-bis(methoxymethyl)-7-trimethylsilylindene; 1,1-bis(methoxymethyl)-7-trifluoromethylindene; 1,1-bis(methoxymethyl)-4,7-dimethyl-4,5,6,7-tetrahydroindene; 1,1-bis(methoxymethyl)-7-methylindene; 1,1-bis(methoxymethyl)-7-cyclopenthylindene; 1,1-bis(methoxymethyl)-7-isopropylindene; 1,1-bis(methoxymethyl)-7-cyclohexylindene; 1,1-bis(methoxymethyl)-7-tert-butylindene; 1,1-bis(methoxymethyl)-7-tert-butyl-2-methylindene; 1,1-bis(methoxymethyl)-7-phenylindene; 1,1-bis(methoxymethyl)-2-phenylindene; 1,1-bis(methoxymethyl)-1H-benz[e]indene; 1,1-bis(methoxymethyl)-1H-2-methylbenz[e]indene; 9,9-bis(methoxymethyl)fluorene; 9,9-bis(methoxymethyl)-2,3,6,7-tetramethylfluorene; 9,9-bis(methoxmethyl)-2,3,4,5,6,7-hexafluorofluorene; 9,9-bis(methoxymethyl)-2,3-benzofluorene; 9,9-bis(methoxymethyl)-2,3,6,7-dibenzofluorene; 9,9-bis(methoxymethyl)-2,7-diisopropylfluorene; 9,9-bis(methoxymethyl)-1,8-dichlorofluorene; 9,9-bis(methoxymethyl)-2,7-dicyclopentylfluorene; 9,9-bis(methoxymethyl)-1,8-difluorofluorene; 9,9-bis(methoxymethyl)-1,2,3,4-tetrahydrofluorene; 9,9-bis(methoxymethyl)-1,2,3,4,5,6,7,8-octahydrofluorene; 9,9-bis(methoxymethyl)-4-tert-butylfluorene.

The catalyst components obtained by using these diethers in fact has shown excellent properties in terms of polymerization activity, stereospecificity and morphological stability even if they were obtained by contacting the titanium compound and the 1,3-diether with Lewis adducts deriving from original $MgCl_2(EtOH)_m$ adducts in which m is from 0.15 to 1.7 that have been in turn obtained by partial dealcoholation of adducts with a higher alcohol content. While we do not intend being bound to any theoretical interpretation, it is believed that the presence of the LB compound in the adduct of the invention, possibly partially dealcoholated, acts in such a way that the interaction of the electron donor compound with the other constituents of the catalyst component becomes more effective.

Suitable electron donors are also the alkyl and aryl esters of mono or polycarboxylic acids such as for example esters of benzoic, phthalic, malonic, glutaric and succinic acid are preferred. Specific examples of such esters are n-butylphthalate, di-isobutylphthalate, di-n-octylphthalate, diethyl 2,2-di-isopropylsuccinate, diethyl 2,2-dicyclohexyl-succinate, ethyl-benzoate and p-ethoxy ethyl-benzoate.

The electron donor compound is generally present in molar ratios with respect to the magnesium comprised between 1:4 and 1:20.

Preferably, the particles of the solid catalyst components have substantially spherical morphology and an average diameter comprised between 5 and 150 μm. With the term substantial spherical morphology are meant those particles having a ratio between the greater and smaller axis equal to or lower than 1.5 and preferably lower than 1.3.

The solid catalyst components according to the present invention show a surface area (by B.E.T. method) generally between 10 and 500 $m^2/g$ and preferably between 20 and 350 $m^2/g$, and a total porosity (by B.E.T. method) higher than 0.15 $cm^3/g$ preferably between 0.2 and 0.6 $cm^3/g$.

The catalyst components of the invention form catalysts for the polymerization of alpha-olefins $CH_2$=CHR, wherein R is hydrogen or a hydrocarbon radical having 1-12 carbon atoms, by reaction or contact with organo-Al compounds in particular Al-alkyl compounds. The alkyl-Al compound is preferably chosen among the trialkyl aluminum compounds such as for example triethylaluminum, triisobutylaluminum, tri-n-butylaluminum, tri-n-hexylaluminum, tri-n-octylaluminum. It is also possible to use alkylaluminum halides, alkylaluminum hydrides or alkylaluminum sesquichlorides such as $AlEt_2Cl$ and $Al_2Et_3Cl_3$ optionally in mixture with said trialkyl aluminum compounds.

The Al/Ti ratio is higher than 1 and is generally comprised between 20 and 800.

In the case of the stereoregular polymerization of α-olefins such as for example propylene and 1-butene, an electron donor compound (external donor) which can be the same or different from the compound used as internal donor can be used in the preparation of the catalysts disclosed above. In case the internal donor is an ester of a polycarboxylic acid, in particular a phthalate, the external donor is preferably selected from the silane compounds containing at least a Si—OR link, having the formula $R_a^1R_b^2Si(OR^3)_c$, where a and b are integer from 0 to 2, c is an integer from 1 to 3 and the sum (a+b+c) is 4; $R^1$, $R^2$, and $R^3$, are alkyl, cycloalkyl or aryl radicals with 1-18 carbon atoms. Particularly preferred are the silicon compounds in which a is 1, b is 1, c is 2, at least one of $R^1$ and $R^2$ is selected from branched alkyl, cycloalkyl or aryl groups with 3-10 carbon atoms and $R^3$ is a $C_1$-$C_{10}$ alkyl group, in particular methyl. Examples of such preferred silicon compounds are methylcyclohexyldimethoxysilane, diphenyldimethoxysilane, methyl-t-butyldimethoxysilane, dicyclopentyldimethoxysilane. Moreover, are also preferred the silicon compounds in which a is 0, c is 3, $R^2$ is a branched alkyl or cycloalkyl group and $R^3$ is methyl. Examples of such preferred silicon compounds are cyclohexyltrimethoxysilane, t-butyltrimethoxysilane and thexyltrimethoxysilane.

Also the 1,3 diethers having the previously described formula can be used as external donor. However, in the case 1,3-diethers are used as internal donors, the use of an external donor can be avoided, as the stereospecificity of the catalyst is already sufficiently high.

As previously indicated the components of the invention and catalysts obtained therefrom find applications in the processes for the (co)polymerization of olefins of formula $CH_2$=CHR in which R is hydrogen or a hydrocarbon radical having 1-12 carbon atoms.

The catalysts of the invention can be used in any of the olefin polymerization processes known in the art. They can be used for example in slurry polymerization using as diluent an inert hydrocarbon solvent or bulk polymerization using the liquid monomer (for example propylene) as a reaction medium. Moreover, they can also be used in the polymerization process carried out in gas-phase operating in one or more fluidized or mechanically agitated bed reactors.

The polymerization is generally carried out at temperature of from 20 to 120° C., preferably of from 40 to 80° C. When the polymerization is carried out in gas-phase the operating pressure is generally between 0.1 and 10 MPa, preferably between 1 and 5 MPa. In the bulk polymerization the operating pressure is generally between 1 and 6 MPa preferably between 1.5 and 4 MPa.

The catalysts of the invention are very useful for preparing a broad range of polyolefin products. Specific examples of the olefinic polymers which can be prepared are: high density ethylene polymers (HDPE, having a density higher than 0.940 g/cc), comprising ethylene homopolymers and copolymers of ethylene with alpha-olefins having 3-12 carbon atoms; linear low density polyethylenes (LLDPE, having a density lower than 0.940 g/cc) and very low density and ultra low density (VLDPE and ULDPE, having a density lower than 0.920 g/cc, to 0.880 g/cc) consisting of copolymers of ethylene with one or more alpha-olefins having from 3 to 12 carbon atoms, having a mole content of units derived from the ethylene higher than 80%; isotactic polypropylenes and crystalline copolymers of propylene and ethylene and/or other alpha-olefins having a content of units derived from propylene higher than 85% by weight; copolymers of propylene and 1-butene having a content of units derived from 1-butene comprised between 1 and 40% by weight; heterophasic copolymers comprising a crystalline polypropylene matrix and an amorphous phase comprising copolymers of propylene with ethylene and or other alpha-olefins.

The following examples are given to illustrate and not to limit the invention itself.

Characterization

Determination of Alcohol Content

The ethanol and ROH content are determined via GC analysis.

Determination of X.I.

2.5 g of polymer were dissolved in 250 ml of o-xylene under stirring at 135° C. for 30 minutes, then the solution was cooled to 25° C. and after 30 minutes the insoluble polymer was filtered. The resulting solution was evaporated in nitrogen flow and the residue was dried and weighed to determine the percentage of soluble polymer and then, by difference the xylene insoluble fraction (%).

EXAMPLES

General Procedure for the Preparation of $MgCl_2.(EtOH)_m$ Adducts

An initial amount of microspheroidal $MgCl_2.2.8C_2H_5OH$ was prepared according to the method described in ex. 2 of U.S. Pat. No. 4,399,054 but operating at 3,000 rpm instead of 10,000. Each of the specific $MgCl_2.(EtOH)_m$ adducts reported in table 1 and used to prepare the adducts of the invention, were then prepared by subjecting to thermal dealcoholation an aliquot of the initial microspheroidal $MgCl_2.2.8C_2H_5OH$ adduct. The thermal dealcoholation was carried out at increasing temperatures from 30 to 130° C. and operating in nitrogen current until the specified value of "m" reported in table 1 was obtained.

General Preparation of $MgCl_2.(EtOH)_m(LB)_n$

Into a 5 L glass reactor, purged with nitrogen, equipped with a mechanical stirrer and a thermometer, 3600 mL of anhydrous hexane were introduced at room temperature. While stirring, 180 g of microspheroidal $MgCl_2(ROH)_m$ adduct prepared according to the general procedure reported above were added. A certain amount of the selected Lewis Base (not used in comparison examples 13-16) dissolved in 300 cc of hexane is slowly added to the slurry, at room temperature, under stirring, in 30 minutes. The amount of Lewis Base is reported as Mg/LB molar ratio in table 1. The suspension was heated up, in 30 minutes, to a specific temperature (see table 1) and reacted under stirring for 3 hours. After the reacting time the solid adduct was allowed settling and the supernatant liquid is siphoned off. Finally the $MgCl_2.(ROH)_m(LB)_n$ adduct was washed two times with hexane and dried under vacuum at 40° C.

Preparation of Solid Catalyst Component General Procedure A.

Into a 2 L four-necked glass reactor, equipped with a mechanical stirrer and a thermometer, purged with nitrogen, 1500 mL of $TiCl_4$ were introduced and cooled at 0° C. While stirring, 60 g of microspheroidal adduct prepared above were added. Subsequently an amount of di-isobutylphthalate corresponding to 0.125 moles per mole of Mg, were added to the suspension. The temperature was raised to 100° C. and maintained for 120 min. Then, the stirring was discontinued, the solid product was allowed to settle at 100° C. for 15 minutes and the supernatant liquid was siphoned off.

Once again 1500 mL of fresh $TiCl_4$ were added on the solid product. The mixture was reacted at 120° C. for 60 min and than the stirring was stopped. The solid product was allowed to settle at 120° C. for 15 min and the supernatant liquid was siphoned off. The solid was washed with hexene three times at 50° C., three more times at room temperature and finally was dried under vacuum at 40° C.

Preparation of Solid Catalyst Component General Procedure B.

Into a 2 L four-necked glass reactor, equipped with a mechanical stirrer and a thermometer, purged with nitrogen, 1500 mL of $TiCl_a$ were introduced and cooled at 0° C. While stirring, 75 g of microspheroidal adduct prepared above were added. Subsequently an amount of 9,9-bis(methoxymethyl) fluorene corresponding to 0.200 moles per mole of Mg, were added to the suspension. The temperature was raised to 100° C. and maintained for 60 min. Then, the stirring was discontinued, the solid product was allowed to settle at 65° C. for 15 minutes and the supernatant liquid was siphoned off.

Then 1500 mL of fresh $TiCl_4$ were added on the solid product. The mixture was reacted at 110° C. for 30 min and than the stirring was stopped and the reactor cooled to 65° C.; the solid product was allowed to settle at 65° C. for 15 min and the supernatant liquid was siphoned off. Once again, 1500 mL of fresh $TiCl_4$ were added on the solid product. The mixture was reacted at 110° C. for 30 min and than the stirring was stopped and the reactor cooled to 65° C.; the solid product was allowed to settle at 65° C. for 15 min and the supernatant liquid was siphoned off. The solid was washed with hexene three times at 50° C., three more times at room temperature and finally was dried under vacuum at 40° C.

Propylene General Polymerization Procedure for Solid Catalyst Component Obtained from General Procedure A In a 4-liter autoclave, purged with nitrogen flow at 70° C. for two hours, 75 ml of anhydrous hexane containing 760 mg of $AlEt_3$, 63 mg of cyclohexylmethyldimethoxysilane and 10 mg of solid catalyst component were introduced in propylene flow at 30° C. The autoclave was closed. 1.5 Nl of hydrogen were added and then, under stirring, 1.2 Kg of liquid propylene were fed. The temperature was raised to 70° C. in five minutes and the polymerization was carried out at this temperature for two hours. The non-reacted propylene was removed, the polymer was recovered and dried at 70° C. under vacuum for three hours and then weighed and analyzed for the determination of the Mg residues by which the activity of the catalyst is calculated.

Propylene General Polymerization Procedure for Solid Catalyst Component Obtained from General Procedure B In a 4-liter autoclave, purged with nitrogen flow at 70° C. for two hours, 75 ml of anhydrous hexane containing 600 mg of $AlEt_3$, and 6 mg of solid catalyst component were introduced in propylene flow at 30° C. The autoclave was closed. 1.0 Nl of hydrogen were added and then, under stirring, 1.2 Kg of liquid propylene were fed. The temperature was raised to 70° C. in five minutes and the polymerization was carried out at this temperature for two hours. The non-reacted propylene was removed, the polymer was recovered and dried at 70° C. under vacuum for three hours and then weighed and analyzed for the determination of the Mg residues by which the activity of the catalyst is calculated.

Examples 1-12 and Comparison Examples 13-16

Preparation of $MgCl_2.(EtOH)_m$ Adducts

All the adducts were prepared according to the general preparation procedure described above.

Examples 17-31 and Comparison Examples 32-38

Catalyst Preparation

Each catalyst was prepared by following the general preparation procedure A or B as reported in table 2.

Polymerization

Depending on the relevant catalyst preparation procedure used, each catalyst was then tested in the polymerization test A or B as described above. The results are shown in table 2.

TABLE 1

| Ex. | MgCl$_2$.(ROH)$_m$(H$_2$O)$_p$ m | P | Synthesis Conditions LB | Mg/LB (mol/mol) | T (°C.) | Support analysis Mg (Wt %) | LB (Wt %) | EtOH (Wt %) | LB/Mg (mol/mol) | EtOH/Mg (mol/mol) |
|---|---|---|---|---|---|---|---|---|---|---|
| 1 | 1.2 | 0.15 | DIPS | 1.25 | 58 | 14.0 | 8.3 | 30.9 | 0.1 | 1.2 |
| 2 | 1.2 | 0.15 | EA | 1.25 | 58 | 15.3 | 5.8 | 33.4 | 0.1 | 1.1 |
| 3 | 1.2 | 0.15 | EA | 0.90 | 25 | 15.4 | 5.7 | 33.8 | 0.1 | 1.1 |
| 4 | 1.2 | 0.15 | Acetone | 2.50 | 25 | 15.2 | 4.4 | 31.5 | 0.1 | 1.1 |
| 5 | 0.7 | 0.16 | THF | 0.77 | 58 | 12.7 | 37.1 | 14.9 | 1.0 | 0.6 |
| 6 | 0.7 | 0.16 | THF | 2.50 | 50 | 16.9 | 15.7 | 21.0 | 0.3 | 0.6 |
| 7 | 0.7 | 0.16 | THF | 1.25 | 58 | 13.6 | 29.5 | 17.3 | 0.7 | 0.7 |
| 8 | 1.2 | 0.15 | THF | 1.25 | 58 | 13.1 | 22.9 | 27.7 | 0.6 | 1.1 |
| 9 | 1.8 | 0.14 | THF | 1.25 | 58 | 12.0 | 16.4 | 41.0 | 0.5 | 1.8 |
| 10 | 1.2 | 0.15 | THF | 1.25 | 50 | 13.8 | 17.8 | 29.2 | 0.4 | 1.1 |
| 11 | 1.8 | 0.14 | THF | 2.50 | 58 | 12.9 | 4.3 | 43.9 | 0.1 | 1.8 |
| 12 | 2.2 | 0.15 | THF | 1.25 | 58 | 10.9 | 17.3 | 45.9 | 0.5 | 2.2 |
| 13* | 0.7 | 0.16 | — | — | — | 18.8 | — | 24.0 | — | 0.7 |
| 14* | 1.2 | 0.15 | — | — | — | 16.0 | — | 35.5 | — | 1.2 |
| 15* | 1.8 | 0.14 | — | — | — | 13.6 | — | 45.2 | — | 1.8 |
| 16* | 2.2 | 0.15 | — | — | — | 12.3 | — | 50.6 | — | 2.2 |

*= comparison example
DIPS = diethyl 2,3-diisopropylsuccinate
EA = Ethylacetate
THF = Tetrahydrofurane

TABLE 2

| Ex. | Catalyst synthesis Adduct of Ex | Preparation Procedure | Catalyst composition Ti (Wt %) | Mg (Wt %) | Cl (Wt %) | I.D. (Wt %) | Catalyst performances Yield (Kg$_{pol}$/g$_{cat}$) | X.I. (Wt %) | BDP (g/cm$^3$) |
|---|---|---|---|---|---|---|---|---|---|
| 17 | 1 | A | 3.6 | 17.8 | 61.4 | 5.0 | 23.0 | 97.2 | 0.432 |
| 18 | 2 | B | 3.8 | 16.8 | 60.0 | 8.4 | 32.0 | 84.8 | 0.409 |
| 19 | 3 | A | 2.8 | 19.5 | 65.0 | 8.4 | 37.0 | 96.9 | 0.420 |
| 20 | 4 | A | 2.8 | 19.9 | 67.7 | 7.6 | 38.0 | 97 | 0.392 |
| 21 | 5 | A | 2.6 | 18.9 | 64.3 | 10.3 | 59.1 | 97.8 | 0.431 |
| 22 | 6 | A | 4.3 | 17.8 | 64.2 | 2.7 | 17.3 | 97.0 | 0.409 |
| 23 | 7 | A | 2.7 | 15.7 | 54.0 | 15.1 | 32.0 | 97.4 | 0.451 |
| 24 | 8 | A | 3.2 | 19.6 | 65.0 | 6.7 | 65.3 | 98.4 | 0.348 |
| 25 | 9 | A | 2.9 | 16.8 | 56.8 | 12.6 | 56.1 | 97.9 | 0.450 |
| 26 | 6 | B | 1.6 | 16.4 | 53.0 | 7.3 | 9.3 | 94.3 | — |
| 27 | 7 | B | 2.4 | 19.3 | 63.6 | 7.4 | 55.2 | 96.9 | 0.442 |
| 28 | 10 | B | 3.7 | 15.8 | 55.2 | 10.6 | 49.5 | 92.7 | 0.410 |
| 29 | 8 | B | 3.8 | 15.2 | 54.4 | 11.7 | 66.1 | 95.6 | 0.379 |
| 30 | 9 | B | 4.1 | 15.0 | 53.3 | 16.1 | 107.2 | 97.8 | 0.445 |
| 31 | 12 | B | 4.3 | 14.4 | 52.7 | 18.1 | 107.6 | 97.6 | 0.382 |
| 32* | 13 | A | 3.3 | 56.7 | 55.1 | 14.8 | 10.3 | 93.2 | — |
| 33* | 14 | A | 2.4 | 20.6 | 66.1 | 5.3 | 25.1 | 95.8 | 0.357 |
| 34* | 15 | A | 3.2 | 18.7 | 63.9 | 9.9 | 41.6 | 97.5 | 0.436 |
| 35* | 13 | B | 2.2 | 18.9 | 61.5 | 3.8 | 6.4 | 75.3 | — |
| 36* | 14 | B | 6.0 | 16.4 | 61.7 | 11.7 | 24.1 | 73.0 | — |
| 37* | 15 | B | 5.3 | 15.6 | 58.2 | 7.2 | 62.3 | 92.5 | 0.408 |
| 38* | 16 | B | 4.9 | 15.4 | 59.2 | 10.6 | 88.9 | 96.0 | 0.403 |

*comparison example

The invention claimed is:

1. Solid Lewis adducts comprising MgCl$_2$, a Lewis base (LB) selected from the group consisting of ethers, ketones, and alkyl esters of C$_1$-C$_{10}$ aliphatic carboxylic acids, and an alcohol ROH, in which R is a C$_1$-C$_{15}$ hydrocarbon group optionally substituted with heteroatom containing groups, which compounds are in molar ratios to each other defined by the following formula: MgCl$_2$(ROH)$_m$(LB)$_n$ in which m ranges from 0.5 to 2.5, and n ranges from 0.07 to 6.

2. The solid Lewis adducts according to claim 1 in which the ethers are C$_2$-C$_{20}$ aliphatic ethers.

3. The solid Lewis adducts according to claim 2 in which the ethers are cyclic ethers having 3-5 carbon atoms.

4. The solid Lewis adducts according to claim 3 in which the cyclic ether is tetrahydrofuran.

5. The solid Lewis adducts according to claim 1 in which the R groups are C$_1$-C$_{10}$ saturated hydrocarbon groups.

6. The solid Lewis adducts according to claim 5 in which the R groups are methyl, ethyl and C$_3$-C$_8$ alkyl groups.

7. The solid Lewis adducts according to claim 1 in which the ROH alcohol is ethanol.

8. The solid Lewis adducts according to claim 1 in which n ranges from 0.08 to 3.

9. The solid Lewis adducts according to claim 8 in which n ranges from 0.1 to 2.5.

10. The solid Lewis adducts according to claim 1 further comprising water in a molar ratio defined by the formula MgCl$_2$(ROH)$_m$(LB)$_n$(H$_2$O)$_p$ in which the index p ranges from 0.01 to 0.6.

11. A process for preparing a solid Lewis adduct comprising MgCl$_2$, a Lewis base (LB) selected from the group consisting of ethers, ketones, and alkyl esters of $C_1$-$C_{10}$ aliphatic carboxylic acids, and an alcohol ROH, in which R is a $C_1$-$C_{15}$ hydrocarbon group optionally substituted with heteroatom containing groups, which compounds are in molar ratios to each other defined by the following formula: $MgCl_2(ROH)_m(LB)_n$ in which m ranges from 0.5 to 2.5, and n ranges from 0.07 to 6; the process comprising (i) contacting $MgCl_2$, ROH and LB optionally in the presence of an inert liquid diluent, thereby forming a mixture, (ii) heating the mixture up to the melting temperature of the mixture and maintaining said conditions so as to obtain a completely molten adduct; and (iii) rapidly cooling the molten adduct, thereby obtaining its solidification.

12. A process for preparing a solid Lewis adduct comprising $MgCl_2$, a Lewis base (LB) selected from the group consisting of ethers, ketones, and alkyl esters of $C_1$-$C_{10}$ aliphatic carboxylic acids, and an alcohol ROH, in which R is a $C_1$-$C_{15}$ hydrocarbon group optionally substituted with heteroatom containing groups, which compounds are in molar ratios to each other defined by the following formula: $MgCl_2(ROH)_m(LB)_n$ in which m ranges from 0.5 to 2.5, and n ranges from 0.07 to 6; the process comprising contacting the LB compound with a preformed solid $MgCl_2(ROH)_m$.

13. The process according to claim 12 in which the $MgCl_2(ROH)_m$ adduct derives from a starting adduct in which part of the alcohol has been removed by physical or chemical dealcoholation.

14. The process according to claim 12 in which the LB compound is in vapor phase.

15. Catalyst components obtained by contacting a solid Lewis adduct comprising $MgCl_2$, a Lewis base (LB) selected from the group consisting of ethers, ketones, and alkyl esters of $C_1$-$C_{10}$ aliphatic carboxylic acids, and an alcohol ROH, in which R is a $C_1$-$C_{15}$ hydrocarbon group optionally substituted with heteroatom containing groups, which compounds are in molar ratios to each other defined by the following formula: $MgCl_2(ROH)_m(LB)_n$ in which m ranges from 0.5 to 2.5, and n ranges from 0.07 to 6, with compounds of transition metals belonging to one of the groups 4 to 6 of the Periodic Table of Elements (new notation).

16. The catalyst components according to claim 15 in which the transition metal compound is a titanium compound of formula $Ti(OR)_nX_{y-n}$ in which n is between 0 and y; y is the valence of titanium; X is halogen and R is an alkyl radical having 1-10 carbon atoms or a COR group.

17. The catalyst components according to claim 15 in which the transition metal compound is selected from the group consisting of $TiCl_3$, $TiCl_4$, $Ti(OBu)_4$, $Ti(OBu)Cl_3$, $Ti(OBu)_2Cl_4$, and $Ti(OBu)_3Cl$.

18. The catalyst components according to claim 15 further comprising an electron donor selected from the group consisting of esters, ethers, amines, and ketones.

19. The catalyst components according to claim 18 in which the electron donor is selected from the group consisting of 1,3-diethers of formula (I)

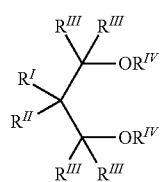

(I)

where $R^I$ and $R^{II}$ are the same or different and are hydrogen or linear or branched $C_1$-$C_{18}$ hydrocarbon groups which can also form at least one cyclic structure; $R^{III}$ groups, equal or different from each other, are hydrogen or $C_1$-$C_{18}$ hydrocarbon groups; $R^{IV}$ groups equal or different from each other, have the same meaning of $R^{III}$ except that they cannot be hydrogen; each of $R^I$ to $R^{IV}$ groups can contain heteroatoms selected from the group consisting of halogens, N, O, S and Si.

20. The catalyst component according to claim 18 in which the electron donor is selected from 1,3-diethers of formula (III)

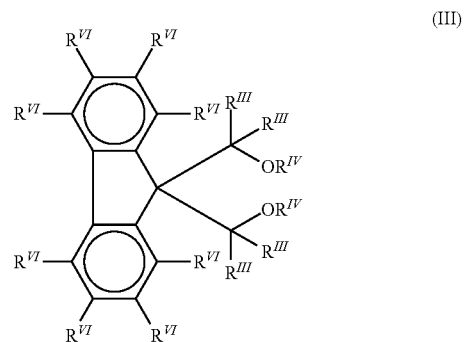

(III)

where the $R^{VI}$ radicals equal or different are hydrogen, halogens; $C_1$-$C_{20}$ alkyl radicals, linear or branched; $C_3$-$C_{20}$ cycloalkyl, $C_6$-$C_{20}$ aryl, $C_7$-$C_{20}$ alkylaryl and $C_7$-$C_{20}$ aralkyl radicals, optionally containing at least one first heteroatom selected from the group consisting of N, O, S, P, Si and halogens as substitutes for carbon or hydrogen atoms, or both; the radicals $R^{III}$ are hydrogen or $C_1$-$C_{18}$ hydrocarbon groups and the radical $R^{IV}$ are $C_1$-$C_{18}$ hydrocarbon groups; and each of $R^{III}$ and $R^{IV}$ can contain a second heteroatom selected from halogens, N, O, S and Si.

21. A catalyst system for the polymerization of alpha-olefins $CH_2$=CHR, wherein R is hydrogen or a hydrocarbon radical having 1-12 carbon atoms, obtained by contacting a catalyst component with at least one organoaluminum compound, the catalyst component being obtained by contacting a solid Lewis adduct comprising $MgCl_2$, a Lewis base (LB) selected from the group consisting of ethers, ketones, and alkyl esters of $C_1$-$C_{10}$ aliphatic carboxylic acids, and an alcohol ROH, in which R is a $C_1$-$C_{15}$ hydrocarbon group optionally substituted with heteroatom containing groups, which compounds are in molar ratios to each other defined by the following formula: $MgCl_2(ROH)_m(LB)_n$ in which m ranges from 0.5 to 2.5, and n ranges from 0.07 to 6, with compounds of transition metals belonging to one of the groups 4 to 6 of the Periodic Table of Elements (new notation).

22. The catalyst system according to claim 21 in which the organoaluminum compound is an Al-alkyl compound.

23. The catalyst system according to claim 22 further comprising an external electron donor compound.

24. A process comprising polymerizing of olefins in the presence of a catalyst obtained by contacting a catalyst component with at least one organoaluminum compound, the catalyst component being obtained by contacting a solid Lewis adduct comprising $MgCl_2$, a Lewis base (LB) selected from the group consisting of ethers, ketones, and alkyl esters of $C_1$-$C_{10}$ aliphatic carboxylic acids, and an alcohol ROH, in which R is a $C_1$-$C_{15}$ hydrocarbon group optionally substituted with heteroatom containing groups, which compounds are in molar ratios to each other defined by the following formula:

$MgCl_2(ROH)_m(LB)_n$ in which m ranges from 0.5 to 2.5, and n ranges from 0.07 to 6, with compounds of transition metals belonging to one of the groups 4 to 6 of the Periodic Table of Elements (new notation).

25. The catalyst component of claim 20 where the $R^{VI}$ radicals are selected from Cl and F.

26. The catalyst component of claim 20 wherein the at least one first heteroatom are selected from Cl and F.

* * * * *